Figure 1:
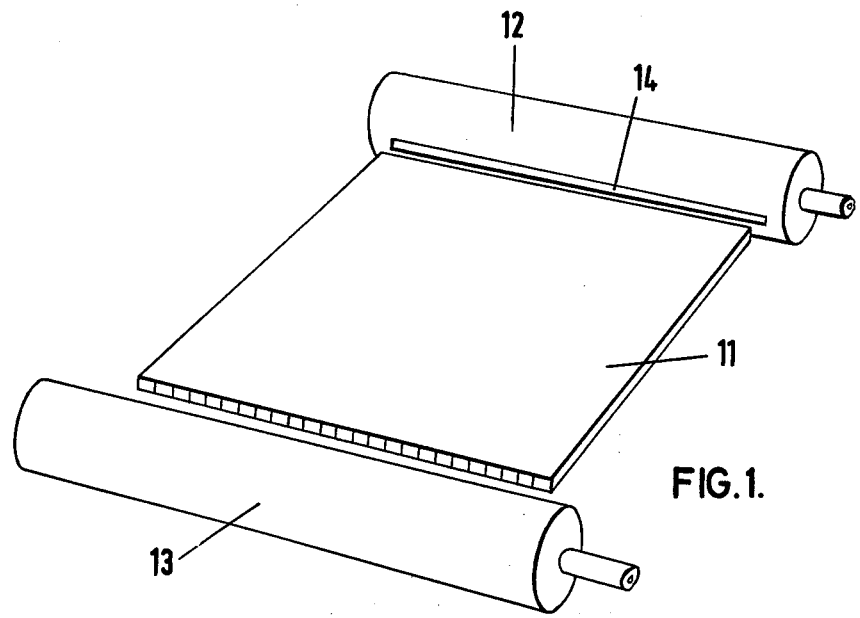

United States Patent

Brackman

[11] 4,102,726
[45] Jul. 25, 1978

[54] JOINING METHOD

[75] Inventor: Derek Samuel Brackman, Stanmore, England

[73] Assignee: Imperial Chemical Industries Limited, London, England

[21] Appl. No.: 707,763

[22] Filed: Jul. 22, 1976

[30] Foreign Application Priority Data

Aug. 4, 1975 [GB] United Kingdom ............. 32488/75

[51] Int. Cl.$^2$ ............................ B29F 3/04; C09J 5/00
[52] U.S. Cl. ............................... 156/244.11; 156/293; 156/306; 156/322
[58] Field of Search .............. 156/244, 304, 306, 322, 156/293, 294, 498, 500

[56] References Cited

U.S. PATENT DOCUMENTS

| | | | |
|---|---|---|---|
| 3,008,862 | 11/1961 | Haine et al. ........................ | 156/244 |
| 3,008,863 | 11/1961 | Morris et al. ....................... | 156/322 |
| 3,279,971 | 10/1966 | Gardnener .......................... | 156/322 |
| 3,580,789 | 5/1971 | Wenzel ............................... | 156/500 |
| 3,740,295 | 6/1973 | Brown ................................ | 156/322 |

*Primary Examiner*—Caleb Weston
*Attorney, Agent, or Firm*—Cushman, Darby & Cushman

[57] ABSTRACT

Rigid thermoplastic articles having sections of different thickness are extrusion welded together, the part of the thicker section to be contacted by the extruded bead being preheated before being thus contacted, to a temperature higher than that of the thinner section. The thicker section may be heated above its softening point, e.g. by the tip of the extruder, while the thinner section remains below its softening point until contacted by the extruded bead. The method is useful for welding thin sectioned profile extruded board to thicker sectioned header pipes during manufacture of heat exchangers such as solar panels.

2 Claims, 4 Drawing Figures

U.S. Patent   July 25, 1978   Sheet 1 of 2   4,102,726

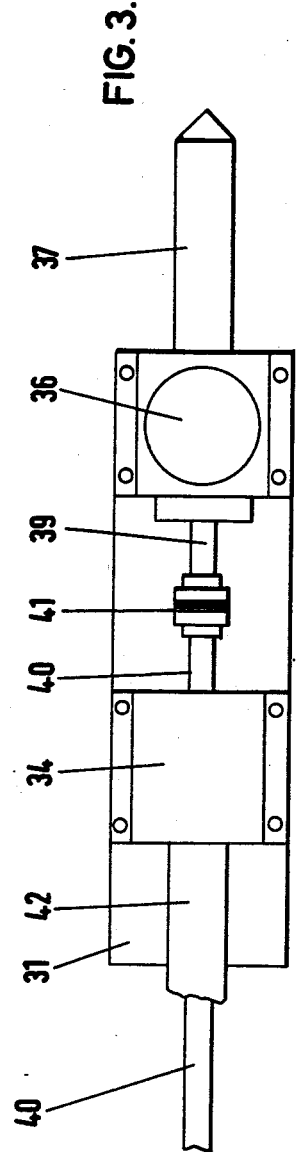
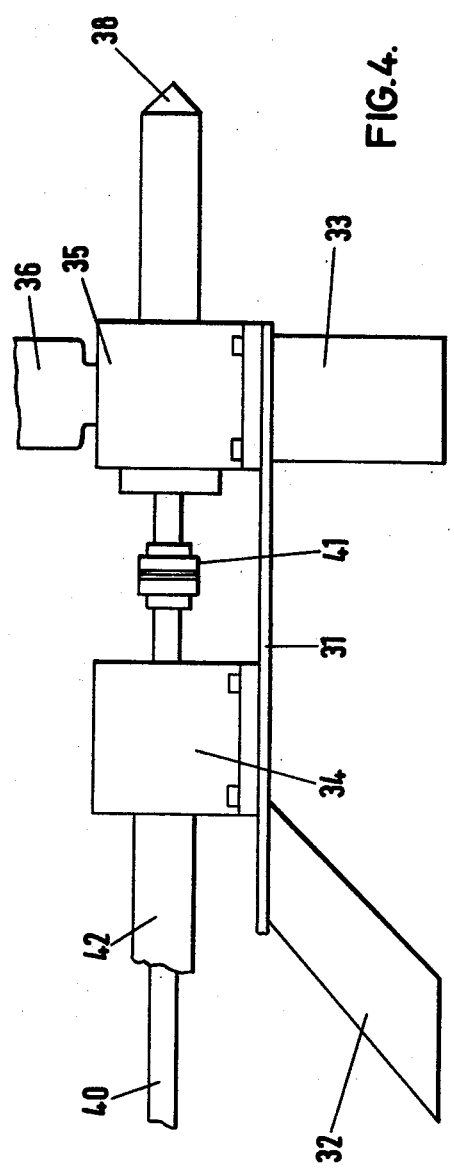

JOINING METHOD

The invention relates to the joining together of rigid shaped articles (including both completed and partially completed objects, and parts therefor) formed of thermoplastic materials, by extrusion welding.

In its broad aspects, extrusion welding is a known technique which comprises bringing into juxtaposition the parts of the articles to be welded together and extruding onto their adjacent surfaces a molten bead of a compatible thermoplastic material at a temperature above the melting temperatures of the articles, so that some of the thermoplastic material of both articles is melted by the bead. The molten bead being compatible with the material it melts, fuses with it, and on cooling forms a welded joint. Extrusion welding can be a very effective technique for use where the articles are of a similar thickness. However problems can arise when self-supporting, thin, rigid sections are to be welded to thick sections, in that extruded beads having sufficient heat to adequately melt the surface of the thicker section with its higher heat capacity, may also have sufficient heat to melt the thinner section to too great a depth and cause distortion. These problems can arise, for example, in the manufacture of heat exchangers such as the solar panels described in German Offenlegungsschrift No. 2,505,015. Illustrative examples are described therein which are manufactured from polypropylene profile extruded packaging board whose outer sheets are typically only 0.4 mm or less thick, and whose header pipes are much thicker, typically about 6 mm thick. Thus whereas it may be possible to extrusion weld these satisfactorily as described above, the margin of error is not large, and too cool an extruded bead will give a weak bond to the header whereas too hot a bead will distort the board.

According to the invention, a method of joining two rigid thermoplastic articles having sections of different thickness, comprises extruding into contact with adjacent parts of both articles a molten bead of compatible thermoplastic material at a temperature above the softening points of the thermoplastic articles so as to fuse with the parts contacted and on cooling form a weld; wherein the part of the thicker sectioned article to be contacted by the extruded bead is preheated before being thus contacted, to a temperature higher than the temperature of the thinner section.

Preferably the part of the thicker sectioned article to be contacted by the extruded bead is preheated above its softening point while the thinner section is maintained below its softening point until contacted by the extruded bead. Particularly preferred is a method in which there is no substantial increase in the temperature of the thinner section during the preheating of the thicker section.

The method of the invention is useful in that it enables the bead to be extruded at a lower temperature without reducing the strength of the weld to the thicker section. This lower bead temperature is advantageous in reducing any tendency for the bead to distort the thinner section. Moreover, where the thermal stability of the extruded material is low, less degradation occurs.

There are several methods for carrying out the preheating, some being more readily adaptable to the differential application of heat than others. Thus for example, preheating of a workpiece can be effected by blowing hot gas onto it, and indeed extrusion welders have been described (e.g. in British Pat. No. 1,187,136) in which hot gas preheating is incorporated. However, with hot gas preheating it is difficult to preheat one article without the other. A preferred method is one in which the thicker section is preheated by heat applied to its surface by a heated tool. The tool may simply be held close to the thicker section to direct radiant heat onto the parts of the surface to be welded, but preferably the tool should actually be brought into contact with the surface. This latter preferment generally enables the position of the parts preheated to be more accurately defined. The heated tool may conveniently be a heated tip of the extruder adjacent the orifice through which the bead is extruded.

Figure 2:
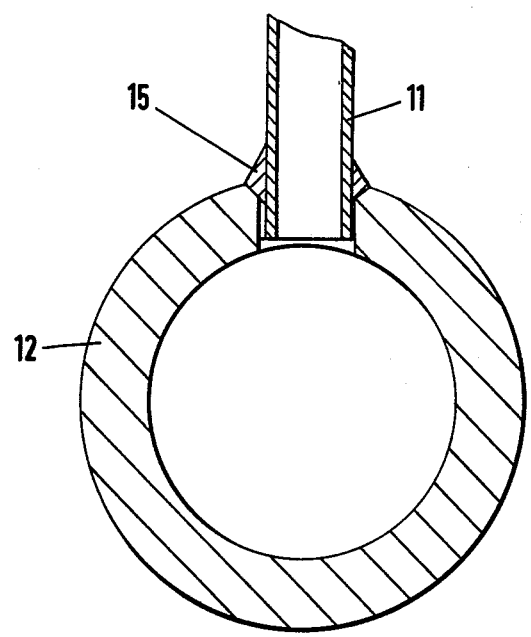

To illustrate the invention, the manufacture of simple shaped articles by the method of the invention, will now be described by way of example, reference being made to the accompanying drawings in which FIG. 1 is an exploded view of a heat exchanger, FIG. 2 is a cross section of a portion of the heat exchanger showing the welded joint, and FIGS. 3 and 4 are plan and elevation views respectively of a suitable extruder.

The heat exchanger illustrated in FIGS. 1 and 2 comprised a polypropylene profile extruded packaging board 11 connected at either end to a polypropylene header 12, 13. (These are shown spaced apart in the exploded view of FIG. 1.) The board was about 1 m wide 2 m long and 4 mm thick, comprising two spaced-apart sheets (each about 0.38 mm thick) connected by a plurality of webs (also about 0.38 mm thick) spaced apart by about 5 mm. The webs divided the space between the two sheets into a plurality of parallel closed channels extending from one header to the other. The webs and the two sheets had been extruded as an integral extrudate of a medium ethylene content (i.e. about 6–10 weight %) polypropylene having a melt flow index (230° C/2 kg) of 0.6.

The headers were formed from 25 mm outside diameter polypropylene tubing having a wall thickness of about 6.4 mm, and milled in the side of the tube was a slot 14 sufficient just to receive one end of the board, the outer lips of the slot being chamfered. Assembly of the heat exchanger entailed inserting the ends of the board into their respective slots in the headers, and applying a bead 15 to weld the two together as described hereinafter.

The extruder used to extrude the bead was a small hand-held extruder as shown in FIGS. 3 and 4. The extruder comprised a base board 31 having two hand grips 32, 33. Mounted on the base board were two bearings 34, 35 out of the latter of which extended a hopper 36 and a barrel 37 of outside diameter 25.4 mm. Around the barrel were two cuff heaters, and the barrel ended in a 45° aluminum nose cone 38 with an orifice for extrusion of the bead at the apex of the cone. Within the barrel was a simple 9.5 mm diameter screw, about 152 mm long. The screw had a drive shaft 39 coupled to a flexible drive shaft 40 by a flexible coupling 41, the flexible shaft being supported by the other bearing 34 to which a flexible torque tube 42 surrounding the flexible shaft was attached.

In forming the heat exchanger, the hopper of the extruder was filled with powder of a medium ethylene content polypropylene of melt flow index (230° C/2 kg) of 0.8, stabilised against degradation by heat and ultraviolet radiation and kept cool by compressed air while in the hopper. On rotation of the screw by a motor (not shown) via the flexible drive, the powder was transported along the barrel where it was heated to a melt temperature of about 270°–290° C. The temperature of the nose cone was about the same as that of the melt, and the bead which extruded had a diameter of about 5 mm. The extruder was mounted on a lathe carriage so that it could be moved at a steady rate along the lathe bed.

The headers were each provided with a chamfered slot 14 to receive the board, and then a transverse V-shaped slot was cut into each header at both ends of the slot. The ends of the board were then inserted into the slots of the two headers, one at either end, and transverse welds made using the V slots, the ends of the welds being trimmed in line with the sides of the board. The assembled board and header unit was then mounted in a jig so as to lie parallel to the lathe bed. The extruder was positioned so that the nose cone touched the header but not the board, and with the bead being extruded, the carriage was moved along the lathe bed, the heated nose cone remaining in contact with the header as it moved along. Orientation of the extruder was such that the extrudate on emerging from the die, was forced against the surfaces of board and headers, into the chamfered slot. The extruder was angled to the board, with the orifice trailing, to provide smoother flow of extrudate into the slot. The direction of movement was such that the molten bead was deposited immediately behind where the nose moved in contact with and melted a strip of the header immediately adjacent the slot, but without touching the board. A single bead was deposited on both sides of the board for each slot, and on cooling a strong watertight join was made between the board and each header without any noticeable puckering of the board.

The invention has been illustrated above by reference to the welding of polyolefins as it is of particular utility in connection with these and other materials for which solvent welding does not readily provide an alternative method. However, the method is, in fact applicable generally to thermoplastic materials suitable for manufacturing moulded articles, even to those having high softening points and hence requiring welding beads extruded at still higher temperatures. To illustrate this there will now be described an operation in which a reinforcing hub was welded onto the surface of a thin sheet, both articles being moulded from a polysulphone having a softening point of about 174° C. The thin sheet had a thickness of 0.38 mm, and the hub was a disc about 5 mm thick and 25 mm diameter.

The extruder had an aluminium nose cone with a 60° apex, and the hopper was supplied with polysulphone of the same composition as that used to mould the articles. Extrusion was commenced with a barrel temperature reading 320° C and the nose cone temperature reading 350° C. A bead of the molten polysulphone was extruded around the perimeter of the disc into contact with both the disc and the surrounding sheet, while the tip of the nose cone was pressed against the disc immediately ahead of the bead to provide preheat. The nose cone tip appeared to melt the disc, digging into the surface slightly, while avoiding contact with the surrounding thin sheet. When a bead had been extruded right round the disc and allowed to cool, the disc was found to be firmly welded to the sheet. With the disc appropriately supported during welding so as to ensure evenness of conditions, a weld could be obtained with little or no distortion of the thin sheet.

Several repeated and comparative experiments were carried out respectively with and without preheating of the discs, and the strengths of the welds tested by manually holding the parts using pliers and pulling apart (having first removed parts of the sheet or provided a bead around only part of the disc perimeter, to enable the disc to be held). The poor welds gave a smooth disc edge while the good welds gave a jagged edge to the disc. It was found that under these conditions of extrusion, good welds were obtained where preheating was applied as described above, but there was generally very poor adhesion between the extruded bead and the disc when there had been no preheating. The welds between the bead and the thin sheet were found generally to be strong.

I claim:

1. A method for manufacturing a heat exchanger of a kind through which a heat exchange fluid is circulated during use, comprising the steps of forming a hollow board of plastic material, the board being internally subdivided into longitudinal tubular passages extending from one end of the board to the other;

locating at either end of the board a tubular header of plastics material having a wall thickness greater than that of the hollow board, each header having at least one aperture aligned with the ends of the tubular passages of the board so as to permit flow of a heat exchange fluid between the interior of the tubular header and said passages;

applying a heated tool to the surface of the parts of the headers which are adjacent to the board while avoiding contact between the board and the tool, thereby to preheat said parts of the header to a temperature higher than that of adjacent parts of the board; and extruding into contact with both the preheated parts of the header and the adjacent parts of the board, a molten bead of compatible thermoplastic material at a temperature above the softening points of the headers and board so as to fuse with the parts contacted and on cooling form a weld, the weld extending completely round the adjacent parts of header and board so as to seal against loss of any fluid which may flow between the header and the board during use.

2. A method according to claim 1 in which the heated tool is a heated tip of the extruder adjacent the orifice through which the bead is extruded.

* * * * *